SERVICE REQUEST PRIORITY RESOLVER AND ENCODER

Filed Aug. 24, 1967

8 Sheets-Sheet 1

INVENTOR.
HERBERT L. ROSENBLATT
BY George L. Kensinger
ATTORNEY

SERVICE REQUEST PRIORITY RESOLVER AND ENCODER

Filed Aug. 24, 1967

INVENTOR.
HERBERT L. ROSENBLATT
BY George L. Kensinger
ATTORNEY

INVENTOR.
HERBERT L. ROSENBLATT
BY George L. Kensinger
ATTORNEY

INVENTOR.
HERBERT L. ROSENBLATT
BY George L. Kensinger
ATTORNEY

INVENTOR.
HERBERT L. ROSENBLATT
BY George L. Kensinger
ATTORNEY

United States Patent Office 3,534,339
Patented Oct. 13, 1970

3,534,339
SERVICE REQUEST PRIORITY RESOLVER AND ENCODER

Herbert L. Rosenblatt, Broomall, Pa., assignor to Burroughs Corporation, Detroit, Mich., a corporation of Michigan Filed Aug. 24, 1967, Ser. No. 663,086
Int. Cl. G06b *11/32*
U.S. Cl. 340—172.5 11 Claims

ABSTRACT OF THE DISCLOSURE

Apparatus for recognizing and simultaneously generating a code corresponding to the highest priority communication channel on which appears a service request signal from among a multiplicity of such channels of preassigned priority, including a plurality of levels of gated code generation means any of which may be enabled by signals from gating means in the same and in successive levels indicating that all higher priority gating means in that level are inactive.

BACKGROUND OF THE INVENTION

Figures 1, 1C:
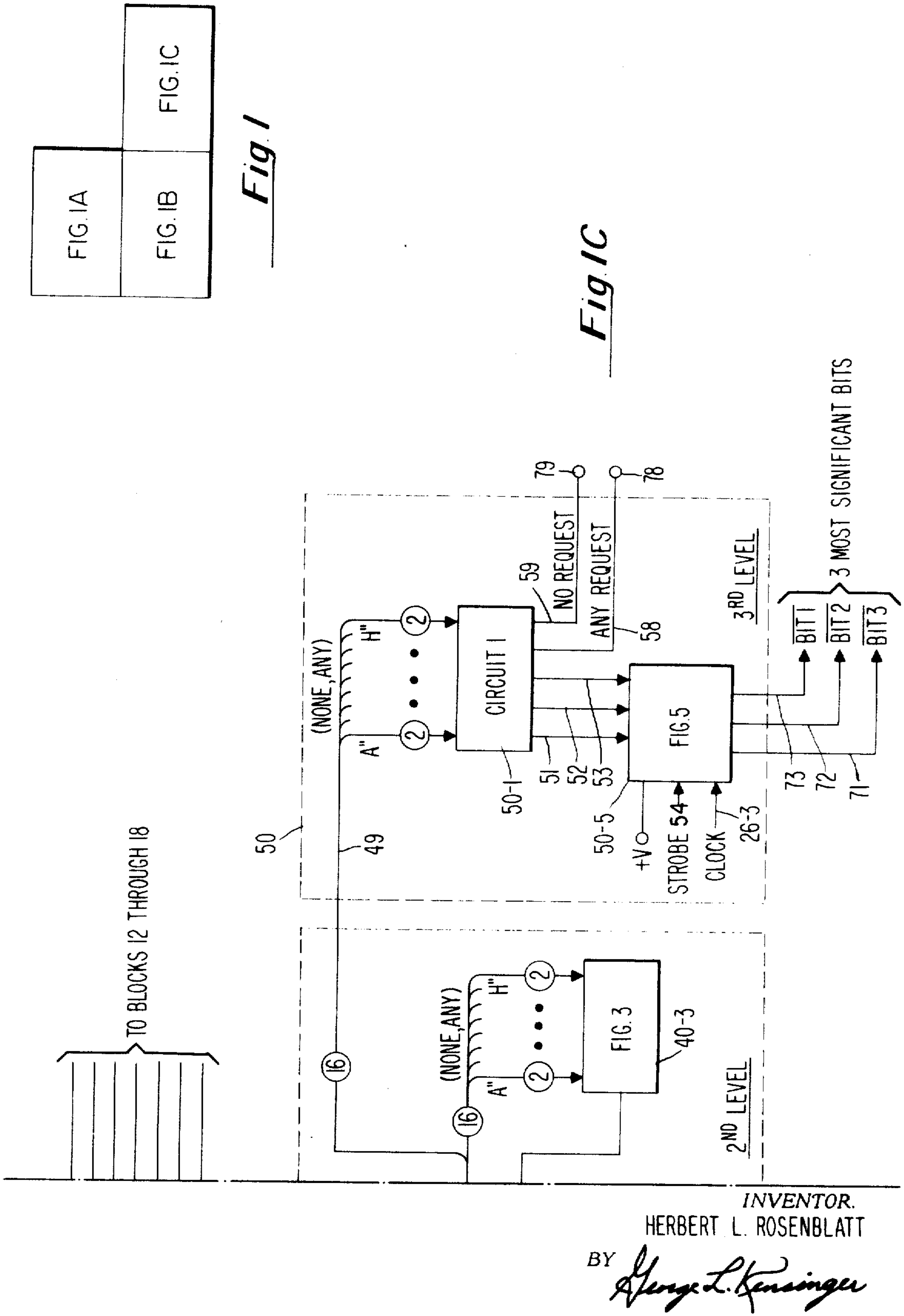

This invention relates to resolving the priority of parallel signals in electrical communications systems and in data processing systems. More particularly, the subject invention relates to recognition of the highest priority signal among signals on a multiplicity of communication channels in such systems and simultaneous encoding of the recognized signal.

One previous method of resolving priority of devices requesting service from a portion of a data processing system has utilized scanners which sense the status of the devices or channels one at a time, or in small groups, in order of preassigned priority and grant service or access to the first request observed. Such scanning is generally controlled by a counter, the state of which determines which device is being observed and also provides the servicing system with the identifying number or code of the recognized device or channel. The chief disadvantage of such systems is that a relatively long time is required to resolve priority since only one or a small number of devices are sensed at a time. If the devices are sensed individually, the minimum scanning period equals the total number of devices in the system multiplied by the period required for counting the counter.

Another method of resolving priority of devices requesting service from a portion of a data processing system involves a two-step operation. The first step is isolating the highest priority channel requesting service. The second step involves encoding the request into the identifying number for that device or channel, as illustrated in U.S. Pat. No. 3,239,819, issued on Mar. 8, 1966. This method requires an inordinate amount of circuitry and is limited in speed due to the separation of priority resolution from the encoding of an identifying number for the recognized request.

SUMMARY OF THE INVENTION

The apparatus of the present invention observes all devices simultaneously and provides the identifying number for the highest priority request signal directly, without isolating the highest priority request first. The circuitry required in the subject invention is considerably less than that required in the last-mentioned prior art method and is much faster than either of the above-mentioned prior art schemes. In addition, only standard logic elements are required for the resolver of the present invention whereas special high speed, high power, hybrid logic would be required for the latter prior art method if utilized for resolving signal priority among a large number of channels. These special requirements are due to the large number of logic loads that would have to be driven in both the isolating and encoding portions of the logic apparatus if a large number of channels were to be serviced by that method.

Accordingly, it is among the objects of this invention to observe all channels in a system simultaneously and to provide the identifying number for the highest priority request signal directly, without isolating the highest priority request first.

Another object of the subject invention is to encode identifier bits of all active devices simultaneously, and to gate out or select the encoded identifier bits corresponding to the request signal which is recognized as being the highest priority signal in the system.

A further object of the present invention is to encode the identifier bits for the highest priority active channel in plural stages or logic levels in systems having a large number of channels.

A still further object of the subject invention is to provide a modular priority resolver and encoder which utilizes a large number of relatively few different circuits for simplifying construction, maintenance, testing, and the stocking of spare parts therefor.

In accordance with the above-mentioned objects, there is provided in a priority resolver and encoder for a communications system having bit encoding means electrically connected to each of the channels for simultaneously encoding each request signal received, code transmission gates electrically connected to the encoding means, and gating means electrically connected to the channels and to the transmission gates for opening the transmission gate associated with the highest priority channel receiving a service request signal. The apparatus of the invention is useful in electronic data processing systems as well as in many types of communications systems.

In accordance with the invention there is further provided a priority resolver and encoder for systems having a large number of communication channels, including a plurality of levels of gated code generators, those of the first level being coupled directly to the different channels and those of the succeeding levels being electrically connected to the generators of the preceding level; a plurality of code output terminals; and gating means associated with each level except the last, each being coupled to the generators of the associated level, to the gating means of all succeeding levels and to the output terminals of the associated level.

Figure 1A:
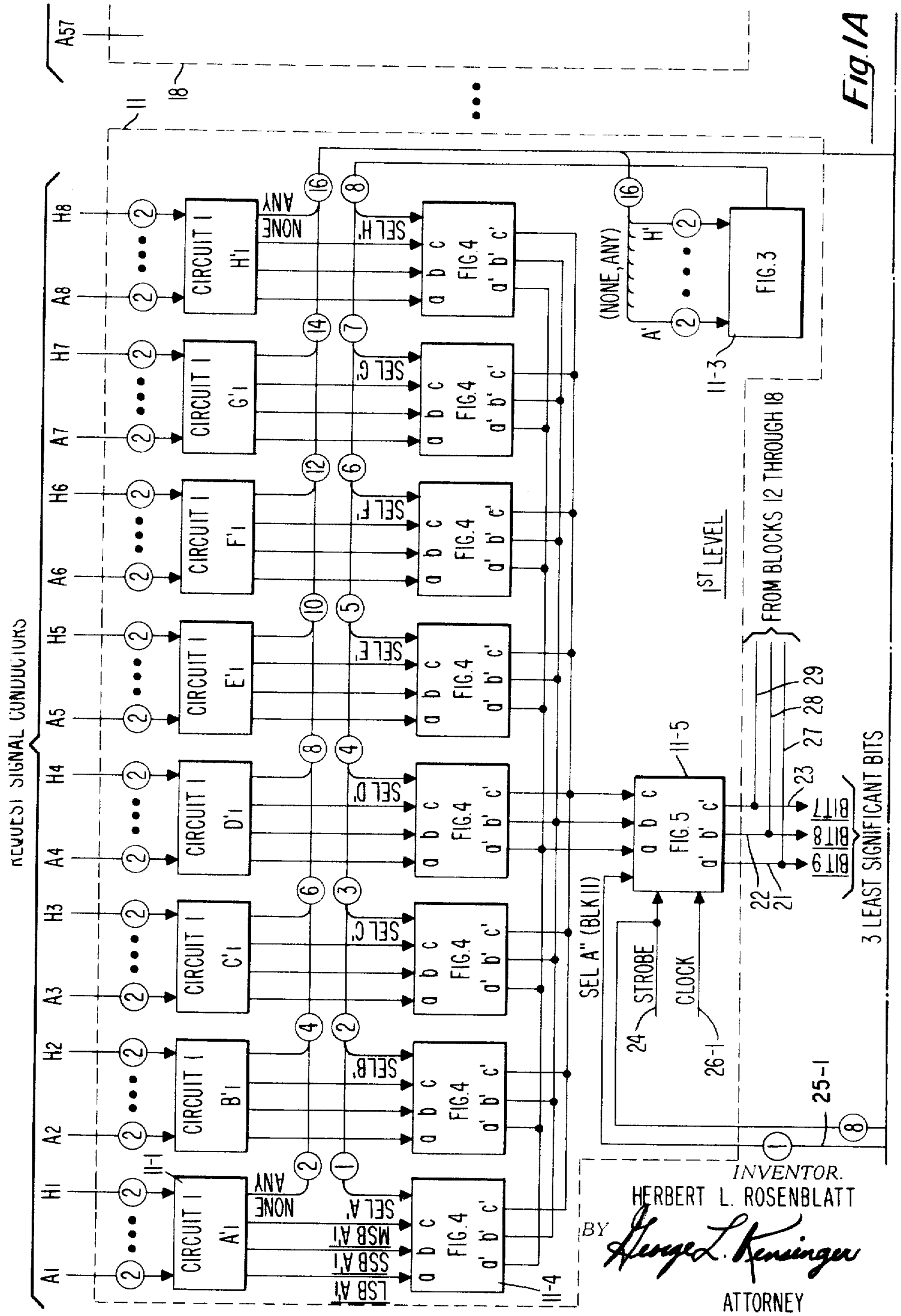
Figure 1B:
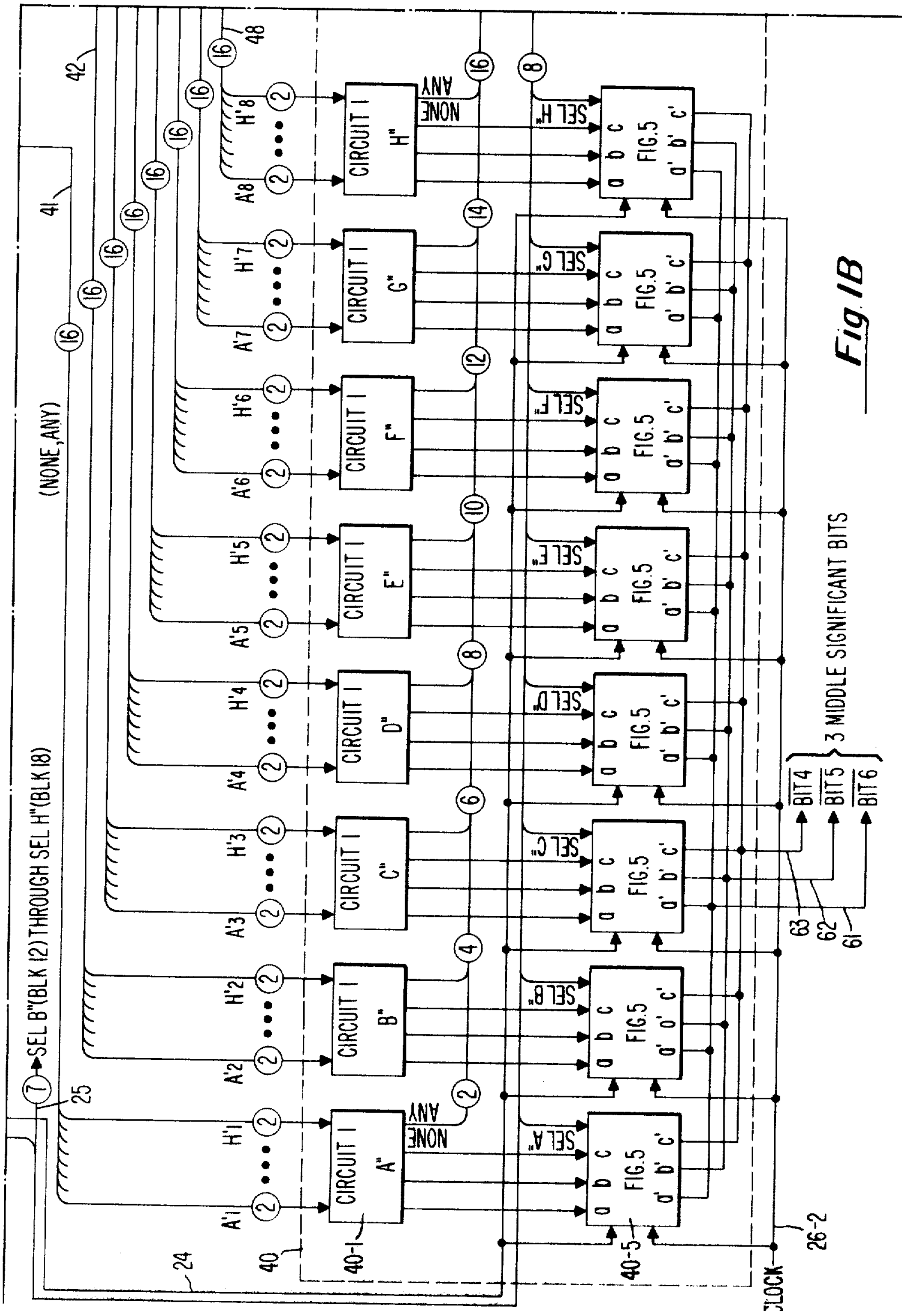
Figure 2:
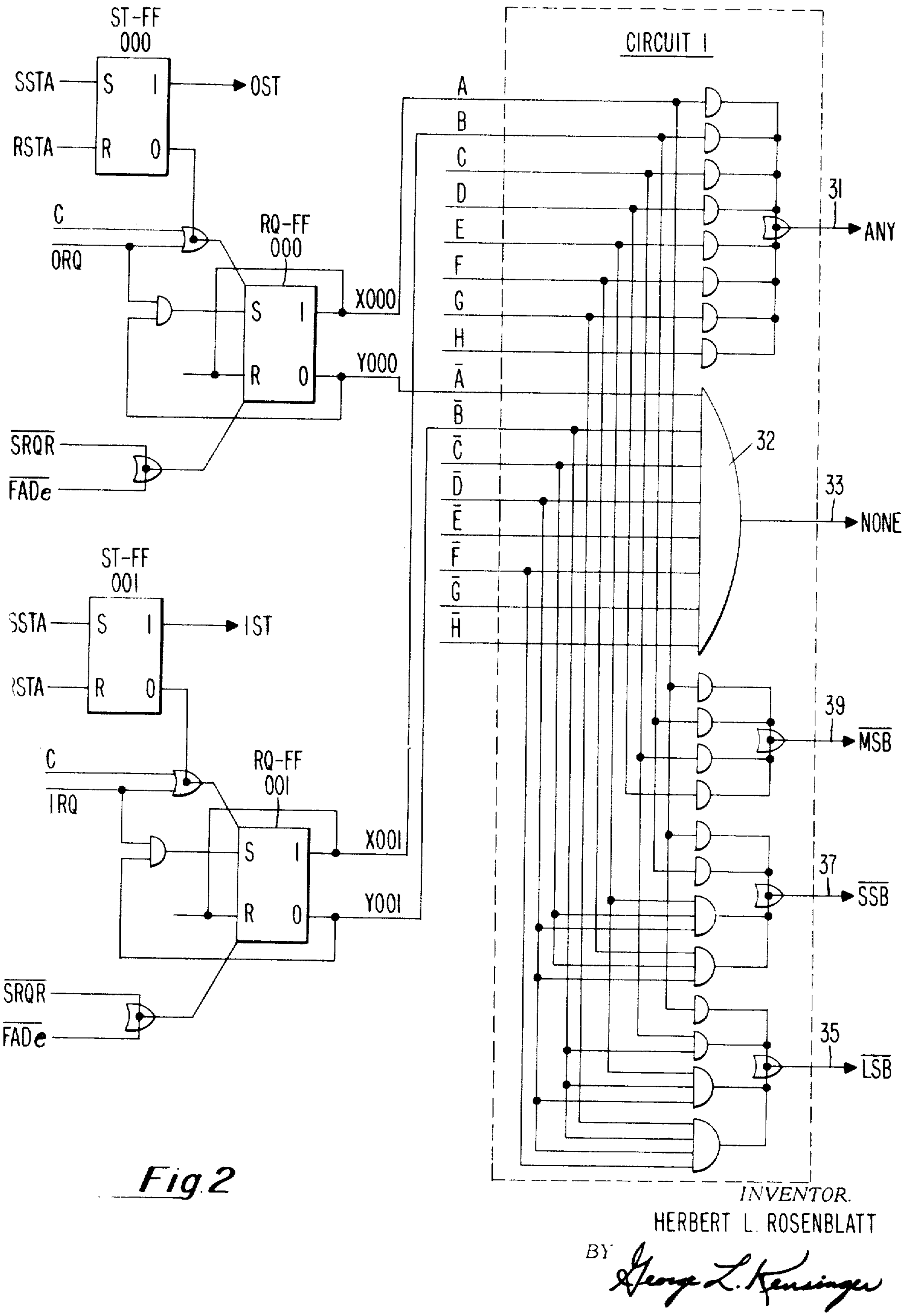
Figure 3:
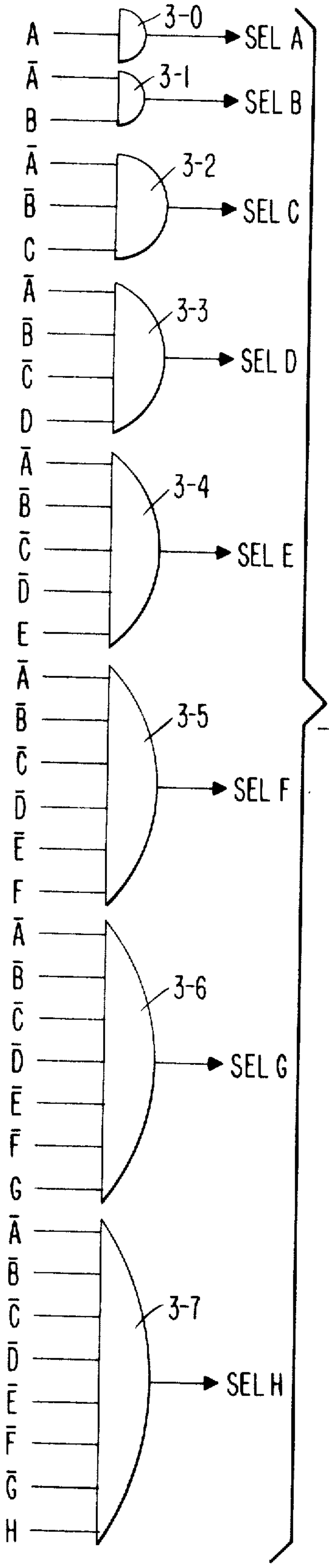
Figure 2A:
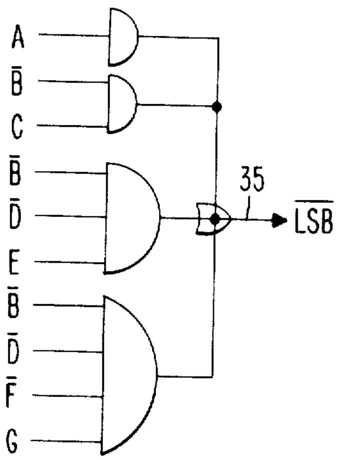
Figure 2B:
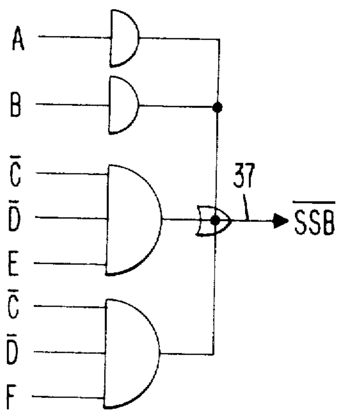
Figure 2C:
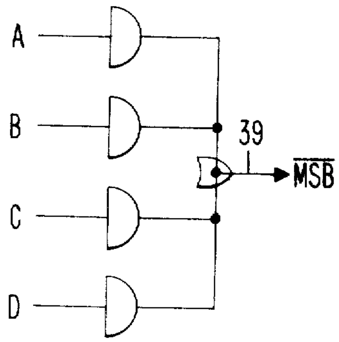
Figure 5:
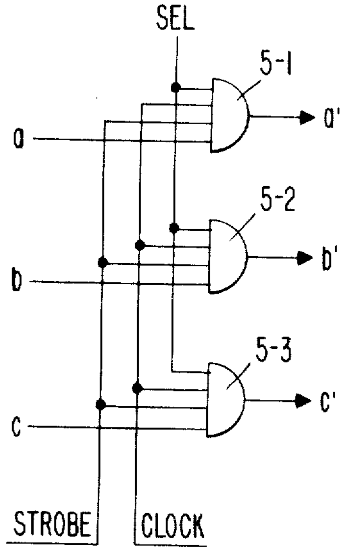
Figure 4:
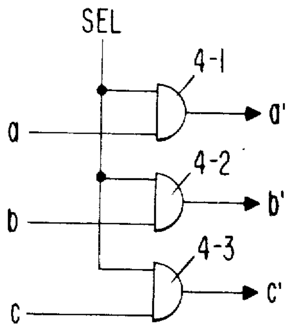
Figures 6, 6C:
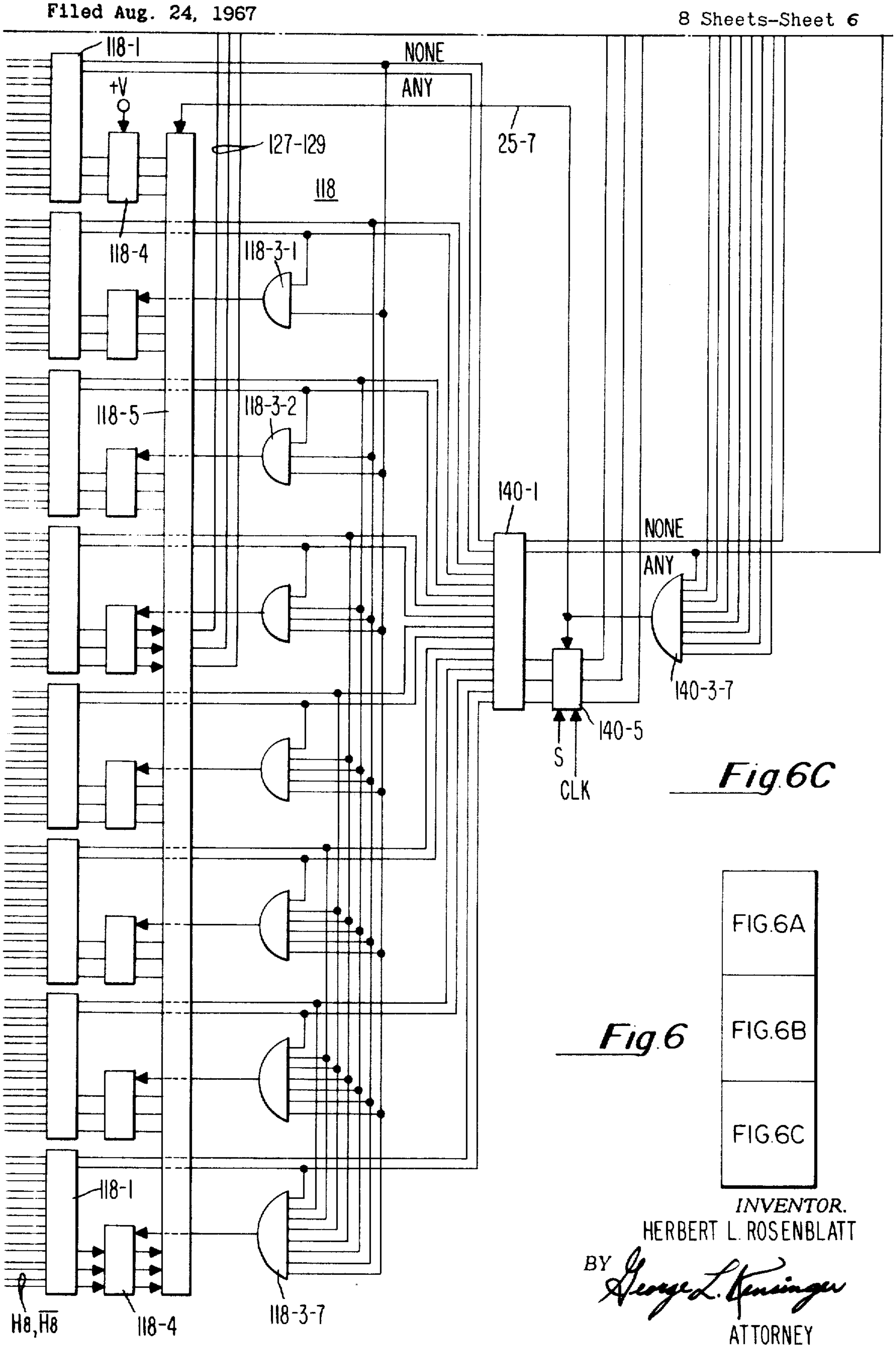
Figure 6A:
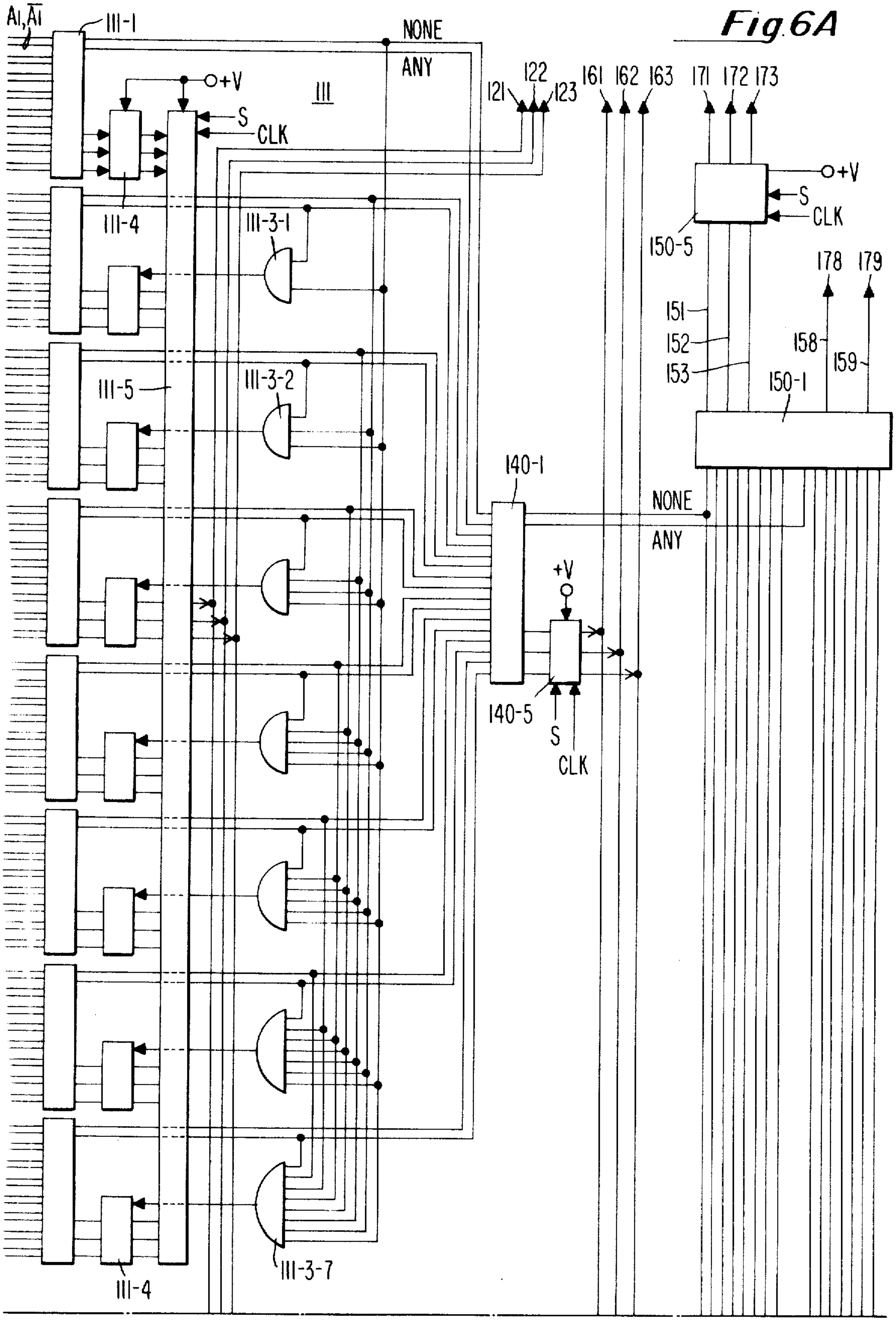
Figure 6B:
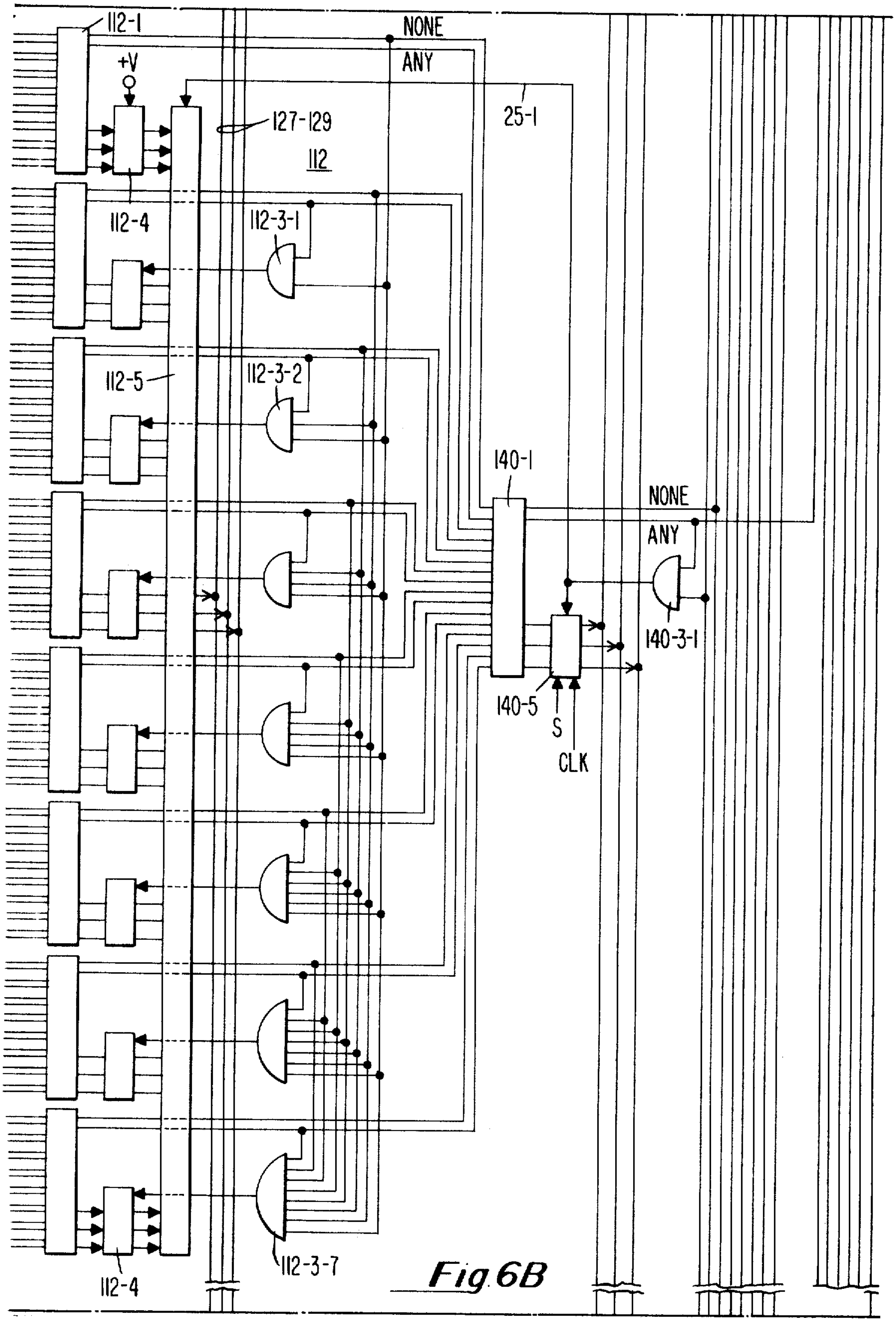

These and other unobvious features and advantages of the present invention, as well as further uses thereof, will become clear to those skilled in the art from a consideration of the remainder of this specification with reference to the accompanying drawings wherein:

FIG. 1, consisting of FIGS. 1A, 1B and 1C, as shown, is a schematic block diagram of a priority resolver and encoder conforming to the present invention;

FIG. 2 is a detailed logic diagram of a portion of the system of FIG. 1;

FIGS. 2A, 2B, and 2C are detailed drawings of portions of the logic diagram shown in FIG. 2;

FIG. 3, 4 and 5 are detailed logic diagrams of other portions of the resolver of FIG. 1 represented therein by rectangular blocks; and FIG. 6, formed of FIGS. 6A, 6B, and 6C as illustrated, is an electrical schematic block diagram of a preferred priority resolver embodiment of the invention.

Referring now to FIG. 1 there is shown a priority resolver and encoder for providing a nine bit binary address corresponding to the highest priority channel bearing a service request signal in a data processing system. Each of the communication channels in the system is electrically coupled to an input device or output device in the system, and may be connected thereto by a controller if desired. The device having the highest rate of data transfer is coupled to the highest priority channel. The binary address to be encoded for the highest priority service-requesting channel is to be inserted into a look-ahead register (not shown) for addressing a location in a memory (not shown) which corresponds to the channel. The address is inserted into the look-ahead register and then passes to the appropriate memory address register for use by the system. An example of a data processing system in which the subject resolver may be utilized is shown and described in Lynch et al., U.S. patent application Ser. No. 509,719, filed on Nov. 26, 1965 and now U.S. Pat. 3,411,139. An example of the manner in which the present priority resolver and encoder may be incorporated in such a system is shown and described in Bradley et al., U.S. application Ser. No. 509,909, also filed on Nov. 26, 1965, and now U.S. Pat. 3,406,380 and assigned to the same assignee as this application.

The apparatus of FIG. 1 was developed for recognizing and encoding a binary number for the highest priority channel among five-hundred twelve (512) channels which presents a service request signal in a data processing system. Both the encoding of a binary number for each of the requesting channels and the resolution of priority among the channels is performed in three levels of logic apparatus. The channels are numbered in descending priority, the lowest numbered channel being of highest priority.

The communication channels are examined in groups of eight, such as $A_1$–$H_1$ and $A_8$–$H_8$. In the first level of the apparatus there are eight logic blocks, such as block 11 and block 18. Each block performs priority resolution and encoding for 64 channels (eight groups of eight channels each). The 8 lines in each group are consecutive in priority and each group of 8 channels is treated simultaneously and independently of the other groups.

Output conductors 21, 22 and 23 transmit the three least significant bits of the number encoded for the highest priority channel recognized as having a service request signal. If the highest priority channel bearing a service request signal is among the channels numbered $A_1$–$H_8$ (the first 64 channels of highest priority) then the least significant bits on conductors 21–23 are received from logic block 11. Otherwise, the least significant bits will be received from one of blocks 12 through 18 over conductors 27–29. Block 18 encodes three bits for each signal and recognizes priority among the signals received on channels numbered $A_{57}$–$H_{64}$, as the eighth block of 64 channels.

Each group of eight channels is connected to a logic element 11–1 labeled circuit 1 through a flip-flop as shown in detail in FIG. 2. As may be seen therefrom, the receipt of a service request signal by a channel such as ORQ or IRQ will set the corresponding request flip-flop 000 or 001. Each channel also has a start flip-flop as indicated in FIG. 2 which is set by a signal SSTA when the corresponding channels are recognized as the highest priority channel having a service request. The setting of a start flip-flop transmits a signal controlling the transmission of data on that channel.

Each of the channel request flip-flops have "1" and "0" outputs which are connected to corresponding X and Y conductors. A signal appearing on a conductor X from a given channel indicates that a service request signal has been received on that channel. Signals appearing on these X conductors are OR-ed together in circuit 1 as signals A through H, to produce a signal on conductor 31 indicating that at least one (ANY) of the channels in the group has received a service request signal.

Signals appearing on the Y conductors for each of the channels are connected to AND gate 32 in circuit 1 as signal $\overline{A}$ through $\overline{H}$ for producing a signal on conductor 33 (NONE) which indicates when none of the channels of the group has received a service request signal. These ANY and NONE signals appearing on conductors 31 and 33 of the logic apparatus shown in FIG. 2, are conducted to the succeeding level of logic shown in FIG. 1 along with the ANY and NONE signals from each of the other seven group logic elements of block 11 through 16-conductor cable 41. The ANY and NONE signals from blocks 12 through 18 of FIG. 1 are likewise transmitted to the logic block of level 2 through 16-conductor cables 42 through 48. These ANY and NONE signals are utilized in the logic block of the second level in a manner similar to the use of the Y signals from the channel request flip-flops in the logic blocks of the first level of the system. The second level logic produces ANY and NONE signals which are transmitted to the logic elements of the third level logic of the system as shown in FIG. 1 by 16-conductor cable 49. The final ANY Service Request signal is developed on conductor 58 and the No Service Request signal is developed on conductor 59 by the third level logic elements of the apparatus.

Returning to the drawing of FIG. 2, the X and Y signal conductors from the channel service request flip-flops are also utilized in circuit 1 for encoding three bits for the highest priority channel receiving a service request signal in a group of channels. The encoding of these bits may be seen more clearly in the circuits of FIGS. 2A, 2B and 2C.

The logic circuit of FIG. 2A develops on conductor 35 the ONE's complement of the least significant bit corresponding to the highest priority channel having a service request signal among a group of eight inputs. The logic equation for this function is:

$$A+\overline{BC}+\overline{BDE}+\overline{BDFG}$$

The ONE's complement signal developed on conductor 35 can be converted readily to the least significant bit of the code corresponding to the recognized channel by a simple inversion which may be performed for example, in an inverting amplifier or by triggering the reset side of a flip-flop in a register. The least significant bit is not encoded directly by the logic circuit of FIG. 2A since more logic elements and inputs would be required for implementing the equation $$LSB=\overline{AB}+\overline{ACD}+\overline{ACEF}+\overline{ACEGH}$$

The mechanization of the second significant bit directly would involve the expression $$\overline{ABC}+\overline{ABD}+\overline{ABEFG}+\overline{ABEFH}$$

Implementation of the most significant bit would involve the expression $$\overline{ABCDE}+\overline{ABCDF}+\overline{ABCDG}+\overline{ABCDH}$$

The apparatus provided in FIGS. 2B and 2C for developing the ONE's complement of the second significant bit and the ONE's complement of the most significant bit of a channel number on conductors 37 and 39 are much less complex.

The ONE's complement of the second significant bit as mechanized by the logic circuit of FIG. 2B may be expressed by $$A+B+\overline{CDE}+\overline{CDF}$$

The ONE's complement of the most significant bit of the code as developed by the logic circuit of FIG. 2C may be expressed as $A+B+C+D$.

The ONE's complements of the least significant bit, second significant bit and most significant bit encoded by logic circuits 11–1 for the highest priority channel of each group in the first level of logic are applied to inputs *a*, *b*, and *c* of the logic circuits 11–4. The ANY and NONE signals developed by the logic circuits 11–1 of block 11 are applied to the inputs of logic circuit 11–3 which is shown in detail in FIG. 3. The SELECT outputs of the circuit 11–3 are applied to the SELECT inputs of the circuits 11–4 for permitting transmission of the bit signals encoded for the highest priority channel having a request signal. The bit output signals from circuits 11–4 are applied to the *a*, *b*, and *c* inputs of logic circuit 11–5 which is shown in more detail in FIG. 5.

Upon being enabled by a strobe signal on conductor 24, a clock signal on conductor 26–1 and a selection signal on conductor 25–1 from the second level of the logic apparatus, logic circuit 11–5 will transmit the code generated for the highest priority channel having a request among the 64 channels connected to block 11 of the first level. Since block 11 is connected to the 64 channels having the highest priority among the total number of communication channels in the system, conductor 25–1 is connected to a permanent bias. This always enables logic circuit 11–5 to produce the three least sigfiincant bits of the desired channel code if one of 64 channels of block 11 is active. If none of the block 11 channels are active then the three least significant bits to be encoded will be generated by one of the blocks 12 through 18 under control of logic circuit 40–3 through cable 25 and will be received by conductors 27–29 as indicated.

The logic circuit 11–3, 40–3 etc. is shown in detail in FIG. 3. This circuit incorporates individual gates 3–0 through 3–7 for deriving SELECT signals for enabling the transmission of encoded bits from one of eight groups of channels or inputs labeled A through H. The inputs to each of the selection gates comprise an ANY signal from the corresponding group which is gated with the NONE signals (Not signals) of all higher priority groups.

As shown in FIG. 1, logic circuit 11–3 receives the ANY and NONE signals from each of the logic circuits 11–1 and has a SELECT output conductor connected to each of the transmission gates 11–4. If logic circuit 11–1 designated $D_1'$ receives a service request signal from one of its channels and none of the higher priority logic circuits $A_1'$ through $C_1'$ receive request sginals, then logic circuit 11–3 will enable the corresponding transmission gate 11–4 through conductor SEL D′ which will transmit least significant bit signals to logic circuit 11–5 for output from the apparatus.

The code transmission gates 11–4 are shown in more detail in FIG. 4. Each gate 4–1 through 4–3 receives an input from one of the bit encoding means of circuit 1 as well as a select signal which controls transmission of the encoded bits. More than one of the logic circuits 11–1 may simultaneously generate least significant bits for a service requesting channel. Circuit 11–3 permits only one of the transmission gates 11–4 to conduct bits to the output gate circuit 11–5. This same gating operation occurs in each of blocks 11 through 18 simultaneously with the code generation therein and the three least significant bits of a channel code will therefore appear immediately on output conductors 21 through 23.

Logic block 40 of the second level of the apparatus receives ANY and NONE signals from each of the eight logic circuits 11–1 of block 11 over sixteen-conductor cable 41. ANY and NONE signals are also received from each of the other first level logic blocks 12 through 18 over sixteen-conductor cables 42 through 48. These signals are received by logic circuits 40–1 labeled A″ through H″ each of which comprises the circuit 1 portion of the drawing of FIG. 2. The middle significant bits produced by these logic circuits are applied directly to corresponding logic circuits 40–5 which must be enabled by a selection signal from logic circuit 40–3 as well as the strobe signal from conductor 24 and a clock signal from conductor 26–2. The middle significant bits generated by the highest priority logic circuit 40–1 as determined by the logic circuit 40–3 will be applied directly to output conductors 61–63 through gate circuits 40–5. The selection signals from logic circuit 40–3 are labeled SEL A″ through SEL H″.

No selection signals are necessary from the remaining level of the logic since it employs only logic circuit 50–1 which receives the ANY and NONE signals from the logic circuits 40–1 of the second level over sixteen-conductor cable 49. If the apparatus were to be modified for servicing more than 512 communication channels, then additional levels or stages could be utilized, in which case selection signals from the third level would be utilized for enabling the output from the second and first levels. This would be similar to the manner of enabling logic circuit 11–5 of the first level by selection signals received from the second level over cable 25–1.

If the priority resolver and encoder of the invention is expanded for more channels, logic circuit 1 shown in FIG. 2 could be modified also to accept more inputs. Fewer channels could be serviced by the system by removing logic circuits from some of the blocks 11 through 18 of the first level or from block 40 or 50 of the second and third levels or entire blocks could be removed as desired.

The final stage 50 of the apparatus incorporates gate circuit 50–5 connected to logic circuit 50–1 for providing the three most significant bits of the code for the highest priority channel receiving a service request signal. The ONE's complements of the three most significant bits are generated by circuit 1 designated 50–1 and applied to logic circuit 50–5 over conductors 51 through 53. The ANY and NONE signals from circuit 50–1 are developed on conductors 58 and 59 and provided to output terminals 78, 79 as the ANY Service Request signal and the No Service Request signal, respectively. The most significant bits are transmitted on output conductors 71 through 73.

The gating circuit shown in FIG. 5 has inputs for receiving bit signals on terminals *a*, *b*, and *c* as well as inputs for receiving SELECT signals, strobe signals and clock signals. The apparatus of this figure is used as the output gate for each of the three levels of the apparatus in order to synchronize the signals with a synchronously operated portion of a data processing system. If however, the invention is to be connected to an asynchronously operated portion of a system, then the apparatus of FIG. 5 is not necessary and a circuit similar to that shown in FIG. 4 could be utilized in its stead. Strobe conductor 54 of the third level may be connected to strobe conductor 24 of the first and second levels and the clock signal conductors 26–1 and 26–3 may be connected together if desired to have simultaneous parallel output of the generated bit signals.

Once a service request is recognized as being the highest priority request on the channels of a system, the requested service is granted. This may be done for example, by setting a start flip-flop which signals a device to transfer data. After completion of data transfer, the request flip-flop for that channel is reset and the priority resolver and encoder simultaneously re-examines each of the channels in the system and grants a service request to the newly recognized highest priority channel. This channel may be of higher or lower priority than the previous channel granted service since service requests may have been received while access or service was granted to the previous channel.

It is important to note that both priority resolution and address encoding is performed simultaneously within the logic blocks of the different levels of the apparatus. It is also noted that priority among the 64 channels of each block (eight groups of eight channels) is resolved in the first logic level of the apparatus disclosed, simultaneously with the generation of $\overline{LSB}$, $\overline{SSB}$, and $\overline{MSB}$ signals for the first level. These three signals constitute the inverse of the three least significant bits of the channel number that is encoded. Priority among the eight blocks of 64 channels in the disclosed apparatus is resolved in the second logic level simultaneously with the generation of $\overline{LSB}$, $\overline{SSB}$, and $\overline{MSB}$ signals which constitute the inverse of the three middle significant bits of the channel address code. The last logic level elements in the system disclosed encodes the three most significant bits of the channel number in the form $\overline{LSB}$, $\overline{SSB}$, and $\overline{MSB}$ signals and produces the ANY Service Request signal and the No Service Request signal. It is also noted that a signal from any given channel passes through four gating levels (11–1, 11–3, 11–4, 11–5, for example) in the development of the channel number.

In the electrical schematic block diagram of FIG. 6 the logic elements corresponding to those of FIGS. 1 and 3 are given similar reference numerals. There are shown eight logic circuits 111–1 for accepting service request signals from a highest priority group of 64 channels, eight logic circuits 112–1 for receiving service request signals from a second group of 64 channels, and eight logic circuits 118–1 for receiving service request signals from an eighth block of 64 channels all employing CIRCUIT 1 of FIG. 2. Each channel is represented by two conductors the first channel conductors being $A_1$, $\overline{A}_1$, and the last channel conductors being $H_8$ and $\overline{H}_8$. The ONE's complement of three bits encoded thereby are applied to transmission gates 111–4, 112–4, and 118–4, respectively, all employing the circuit of FIG. 4 for conduction to output gates 111–5, 112–5, and 118–5 all employing the circuit of FIG. 5 when recognized as the priority channel group including an active channel. The output gates themselves, must be enabled by the next level of logic.

The first gate of transmission gates 111–4, 112–4 and 118–4 is permanently enabled by a bias voltage +V as shown, and will conduct encoded bits to the respective ouput gates 111–5, 112–5 and 118–5 if there is an active channel in the first group of any of the blocks. Each of the other transmission gates 111–4 will be enabled only upon receiving a SELECT signal from one of AND gates 111–3–1 through 111–3–7 which gate the ANY signal of the associated group with the NONE signals from each of the higher priority groups of the block.

The second to the eighth gate of transmission gates 112–4 of the second block and the second to the eighth one of transmission gates 118–4 are likewise each enabled by SELECT signals from one of AND gates 112–3–1 through 112–3–7 and AND gates 118–3–1 through 118–3–7, respectively. Thus, priority amoung the groups 111–1 of eight channels in the first block is resolved within the first block itself and priority among the groups 112–1 and 118–1 of eight channels in the next and in the last block is resolved within those logic blocks themselves. It remains to resolve priority between the 64 channel blocks 111, 112 . . . 118 and to enable the conduction of nine channel code bits to the output terminals 121–123, 161–163 and 171–173.

The three middle significant bits of the channel code are developed in circuits 140–1 of the second logic level of the apparatus and are applied to transmission gates 140–5. The first transmission gate 140–5 is biased by a voltage +V and each of the remainder is enabled by a SELECT signal from one of AND gates 140–3–1 through 140–3–7 over conductors 25–1 through 25–7. These gates detect conicidence of an ANY signal from the corresponding logic circuit 140–1 and NONE signals from all higher priority circuits 140–1, there being a logic circuit 140–1 for each logic block 111, 112 . . . 118 of the first level. The SELECT signals from AND gates 140–3–1 through 140–3–7 are also applied to the second through the eighth block output gates 12–5 through 118–5 over conductors 25–1 through 25–7. Therefore, AND gates 140–3–1 through 140–3–7 enable the conduction of the three least significant bits of the channel code onto conductors 127–129 through output gates 111–5, 112–5 through 118–5 and enable the conduction of the three middle significant bits of the channel code onto conductors 161–163 through output gates 140–5. Output gates 111–5, 112–5 through 118–5, and 140–5 also have strobe input terminals S and clock input terminals CLK which must be activated for transmitting the encoded bits to the output terminals.

The ANY and NONE signals from logic circuits 140–1 are connected to the inputs of logic circuit 150–1, as shown in the third level of logic. Circuit 150–1 encodes three bits on conductors 151–153 which are gated through circuit 150–5 by strobe and clock signals and appear on conductors 171–173 as the three most significant bits of the channel.

The circuit 150–1 also develops on conductor 158 and terminal 178 a final ANY Service Request signal and on conductors 159 and terminal 178 the No Service Request signal. The unused SELECT terminal of the gate circuit 150–5 is biased with a voltage +V so as to be permanently enabled.

Although certain embodiments of the present invention have been described in detail, it should be understood that the present disclosure has been made by way of example only and that many modifications and variations of the present invention are possible in the light of the above teachings. It is therefore to be understood that within the scope of the appended claims the invention may be practiced otherwise than as specifically described.

I claim:

1. Apparatus for providing an encoded binary number corresponding to the highest priority channel bearing a signal among a plurality of channels of preassigned priority comprising:
   - input means for transmitting TRUE and NOT signals for each channel of said plurality of channels,
   - output terminal means for presenting bit signals repsenting the channel number to be encoded, and
   - means selectively electrically connected to said input means and and to said output terminal means for receiving preselected combinations of the TRUE and NOT channel signals from said input means and directly encoding the bit signals of the number representing the highest priority channel providing a signal.

2. The apparatus of claim 1 wherein the means directly encoding the bit signals representing the number of the highest priority channel providing a signal comprises gating means for developing the ONE's complement of each of the bits of that highest priority channel number.

3. The apparatus of claim 1 wherein the input means comprises a flip-flop for each channel having a set terminal electrically coupled to the associated channel and having output terminals for providing to the encoding means TRUE and NOT signal levels corresponding to the state of the channel.

4. Apparatus for resolving priority among signals on a plurality of conductors of preassigned priority and substantially simultaneously encoding a binary number for the highest priority conductor bearing a signal comprising:
   - input means for receiving TRUE and FALSE signals for each conductor or channel,
   - output terminal means for presenting bit signals representing the conductor number to be encoded,
   - a plurality of encoding means each selectively electrically connected to said input means for receiving preselected TRUE and FALSE channel signals and encoding the bit signals corresponding to the highest priority channel providing a signal among a selected group of channels,
   - bit transmission gates electrically connected to said encoding means and to said output terminal means, and
   - group priority gating means electrically connected to the encoding means and to the transmission gates for enabling conduction of the bits encoded for the highest priority channel of the highest priority group of channels bearing a signal.

5. The apparatus of claim 4 wherein the group priority gating means comprises AND gates each detecting the coincidence of an ACTIVE or TRUE channel signal from the associated group of channels and the absence of ACTIVE channels in all higher priority groups.

6. The apparatus of claim 4 wherein each encoding means develops ANY and NONE signals for the corresponding group of channels signifying the presence and absence, respectively, of a TRUE channel signal among the channels of the associated group.

7. The apparatus of claim 4 wherein each encoding means comprises gating means developing the ONE's complement of each of the bits of the number corresponding to the highest priority channel bearing a signal among the associated group.

8. Apparatus for resolving priority among signals on a multiplicity of communication channels of preassigned priority and substantially simultaneously encoding a binary number for the highest priority channel bearing a signal comprising:

input means for receiving TRUE and NOT signals for each channel, output terminal means for presenting bit signals repsenting the channel number to be encoded, a first pluarilty of bit encoding means each electrically connected to said input means for receiving TRUE and NOT channel signals and for encoding a first set of bit signals corresponding to the highest priority channel providing a signal among a selected group of channels and ANY and NONE signals for the associated group, a first plurality of bit transmission gating means electrically connected to said encoding means and to said output terminal means, group priority gating means electrically connected to the encoding means and to the transmission gating means, a second plurality of bit encoding means each electrically connected to the ANY and NONE output terminals of the first plurality of bit encoding means for encoding a second set of bit signals representing the highest priority group providing a signal among the groups of channels, a second plurality of bit transmission gating means electrically connected to the second encoding means and to said output terminal means, and second priority gating means electrically connected to the second encoding means and to the first and second bit transmission gating means for enabling conduction of the bits for the highest priority channel signal.

9. The apparatus of claim 8 wherein the second bit encoding means each develops ANY and NONE signals for a plurality of groups of channels signifying the presence and absence, respectively, of a group having an ACTIVE channel among the associated groups.

10. The apparatus of claim 9 wherein the priority gating means each comprises AND gates detecting the coincidence of an ANY signal from the associated encoding means and NONE signals from all higher priority encoding means.

11. The apparatus of claim 9 further comprising a third bit encoding means electrically connected to the ANY and NONE output terminals of the second plurality of bit encoding means for encoding a third set of bit signals for the highest priority channel providing a signal.

References Cited

UNITED STATES PATENTS

| | | | |
|---|---|---|---|
| 3,353,160 | 11/1967 | Lindquist | 340—172.5 |
| 3,377,579 | 4/1968 | Wissick | 340—172.5 |
| 3,395,394 | 7/1968 | Cotrell | 340—172.5 |
| 3,425,037 | 1/1969 | Patterson | 340—172.5 |

PAUL J. HENON, Primary Examiner
R. F. CHAPURAN, Assistant Examiner

U.S. Cl. X.R.

307—203

PO-1050
(5/69)

UNITED STATES PATENT OFFICE
CERTIFICATE OF CORRECTION

Patent No. 3,534,339 Dated October 13, 1970

Inventor(s) H. L. Rosenblatt

It is certified that error appears in the above-identified patent and that said Letters Patent are hereby corrected as shown below:

Column 4, line 35, equation "$A+\overline{BC}+\overline{BDE}+\overline{BDFG}$" should read --$A+\overline{B}C+\overline{BD}E+\overline{BDF}G$--; line 47, equation "$LSB=\overline{AB}+\overline{ACD}+\overline{ACEF}+\overline{ACEGH}$" should read --$LSB=\overline{A}B+\overline{AC}D+\overline{ACE}F+\overline{ACEG}H$-- ; line 51, equation "$\overline{ABC}+\overline{ABD}+\overline{ABEFG}+\overline{ABEFH}$" should read --$\overline{AB}C+\overline{AB}D+\overline{ABEF}G+\overline{ABEF}H$-- ; line 55, equation "$\overline{ABCDE}+\overline{ABCDF}+\overline{ABCDG}+\overline{ABCDH}$" should read --$\overline{ABCD}E+\overline{ABCD}F+\overline{ABCD}G+\overline{ABCD}H$-- ; line 64, equation "$A+B+\overline{CDE}+\overline{CDF}$" should read --$A+B+\overline{CD}E+\overline{CD}F$-- .

SIGNED AND
SEALED
DEC 29 1970

SEAL)
ttest:

dward M. Fletcher, Jr.
ttesting Officer

WILLIAM E. SCHUYLER, JR.
Commissioner of Patents